United States Patent
Kim et al.

(10) Patent No.: US 12,553,049 B2
(45) Date of Patent: Feb. 17, 2026

(54) PHARMACEUTICAL COMPOSITION CONTAINING SIRT7 INHIBITOR FOR PREVENTING OR TREATING ALLERGIC DISEASES

(71) Applicant: KOREA UNIVERSITY RESEARCH AND BUSINESS FOUNDATION, Seoul (KR)

(72) Inventors: Tae-hoon Kim, Seoul (KR); Junhyoung Byun, Uijeongbu-si (KR); Kijeong Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 606 days.

(21) Appl. No.: 18/002,877

(22) PCT Filed: May 10, 2021

(86) PCT No.: PCT/KR2021/005819
§ 371 (c)(1),
(2) Date: Dec. 22, 2022

(87) PCT Pub. No.: WO2022/005012
PCT Pub. Date: Jan. 6, 2022

(65) Prior Publication Data
US 2023/0332155 A1 Oct. 19, 2023

(30) Foreign Application Priority Data
Jun. 30, 2020 (KR) .......................... 10-2020-0079761

(51) Int. Cl.
*C12N 15/113* (2010.01)
*G01N 33/50* (2006.01)

(52) U.S. Cl.
CPC ..... *C12N 15/1137* (2013.01); *G01N 33/5044* (2013.01); *C12N 2310/14* (2013.01)

(58) Field of Classification Search
CPC .. C12N 15/1137; C12N 2320/30; A61P 37/08
USPC ..................... 435/6.1, 91.1, 91.31, 455, 458; 514/44 A; 536/23.1, 24.5
See application file for complete search history.

(56) References Cited

U.S. PATENT DOCUMENTS

2012/0195870 A1* 8/2012 Herrmann .............. A61K 8/345
424/94.1

FOREIGN PATENT DOCUMENTS

| CN | 109507430 A | 3/2019 |
| JP | 2007535518 A | 12/2007 |
| KR | 20140123701 A | 10/2014 |
| KR | 101915115 B1 | 11/2018 |

OTHER PUBLICATIONS

Roberts et al (Nature Rev., Drug Discovery, vol. 19, pp. 673-694 (2020)) (Year: 2020).*
Kobelt et al (Cancer Gene Therapy in Gene Therapy of Cancer: Methods and Protocols, Methods in Molecular Biology, vol. 2521, pp. 1-15 (Springer Nature 2022)) (Year: 2022).*
Osborn et al (Nucleic Acid Therapeutics, vol. 28, No. 3, pp. 128-136 (2018)) (Year: 2018).*
Bost et al (ACS Nano, vol. 15, pp. 13993-14021 (2021)) (Year: 2021).*
Damase et al (Frontiers in Bioengineering and Biotechnology, vol. 9, Article 628137, pp. 1-24 (2021)) (Year: 2021).*
PCT International Search Report for International Application No. PCT/KR2021/005819, dated Aug. 25, 2021, 5 pages.
Yuan et al., "SIRT1 attenuates murine allergic rhinitis by downregulated HMGB 1/TLR4 pathway," Experimental Immunology, Wiley Immunology, 2018, vol. 87, 9 pages.

* cited by examiner

*Primary Examiner* — Jane J Zara
(74) *Attorney, Agent, or Firm* — Hoffman Warnick LLC

(57) ABSTRACT

The present invention relates to treatment and prevention of allergic diseases and, specifically, to an allergic disease immunomodulation method, which suppresses SIRT7 of nasal cavity epithelial cells to inhibit allergy mediators. The present invention suppresses SIRT7 of nasal cavity epithelial cells to inhibit the secretion of epithelial cell cytokines (TSLP), which recognize allergens to attract immune cells that induce an immune response, so that high-level processes of allergic reactions are blocked, and thus allergic diseases can be fundamentally treated and prevented.

6 Claims, 3 Drawing Sheets
Specification includes a Sequence Listing.

SEQUENCE LISTING

<160> NUMBER OF SEQ ID NOS: 4

<210> SEQ ID NO 1
<211> LENGTH: 21
<212> TYPE: RNA
<213> ORGANISM: Artificial Sequence
<220> FEATURE:
<223> OTHER INFORMATION: SIRT7 siRNA_si1_guide sequecne

<400> SEQUENCE: 1
acuuucuucc uuuugugcg u

```
<210> SEQ ID NO 2
<211> LENGTH: 21
<212> TYPE: RNA
<213> ORGANISM: Artificial Sequence
<220> FEATURE:
<223> OTHER INFORMATION: SIRT7 siRNA_si1_passenger sequecne

<400> SEQUENCE: 2
gcacaaaaag gaagaaagug a                                                    21

<210> SEQ ID NO 3
<211> LENGTH: 21
<212> TYPE: RNA
<213> ORGANISM: Artificial Sequence
<220> FEATURE:
<223> OTHER INFORMATION: SIRT7 siRNA_si2_guide sequecne

<400> SEQUENCE: 3
ugauuacguc acuuucuucc u                                                    21

<210> SEQ ID NO 4
<211> LENGTH: 21
<212> TYPE: RNA
<213> ORGANISM: Artificial Sequence
<220> FEATURE:
<223> OTHER INFORMATION: SIRT7 siRNA_si2_passenger sequecne

<400> SEQUENCE: 4
gaagaaagug acguaaucac g                                                    21
```

PHARMACEUTICAL COMPOSITION CONTAINING SIRT7 INHIBITOR FOR PREVENTING OR TREATING ALLERGIC DISEASES

SEQUENCE LISTING

The sequence listing contained in the electronic file titled "FPC-2021-0180US_sequence_listing_REPLACEMENT_05-18-2023.txt," created 18 May 2023 and comprising 1,003 bytes, is hereby incorporated herein.

TECHNICAL FIELD

The following description relates to treatment and prevention of allergic diseases, and more specifically, an allergic disease immunomodulation method for inhibiting allergy mediators by suppressing Sirtuin 7 (SIRT7) of nasal cavity epithelial cells.

BACKGROUND ART

Conventional immunomodulation methods used in the prevention and treatment of allergic diseases are largely divided into 1) immunotherapy that induces resistance to the allergen by gradually administering a causative allergen to allergic patients to alter the progress of disease, and 2) immunomodulatory therapy that inhibits allergic reactions by reducing a Th2 immune response caused by various factors.

However, in 1) the immunotherapy that induces the resistance by administering the allergen, side effects such as edema, hives, and dyspnea occur frequently depending on a dose, and the 2) immunomodulatory therapy that reduces the pre-occurring Th2 immune response is involved in a lower mechanism of allergy or the regulation of immune cells acting on the lower mechanism, so that symptoms tend to recur when the therapy is stopped.

Accordingly, the present inventors developed a fundamental treatment and prevention method for allergic diseases through a method of suppressing antigen recognition even in high-level processes of the immune response so as to reduce the Th2 immune response.

DISCLOSURE OF THE INVENTION

Technical Goals

The present disclosure has been completed by finding a correlation between overexpression of SIRT7 and allergic diseases. An aspect provides a pharmaceutical composition for preventing or treating allergic diseases capable of regulating the expression or activity of SIRT7, and a screening method of a drug for preventing or treating allergic diseases by tracking the expression level of SIRT7.

However, technical aspects of the present disclosure are not limited to the aforementioned purpose and other objects which are not mentioned may be clearly understood to those skilled in the art from the following description.

Technical Solutions

According to an aspect, there is provided a pharmaceutical composition for preventing or treating allergic diseases including an SIRT7 inhibitor.

According to another aspect, there is provided a method for preventing or treating allergic diseases including administering an SIRT7 inhibitor to a subject.

According to yet another aspect, there is provided a use of an SIRT7 inhibitor for preparing a drug for preventing or treating allergic diseases.

In an example embodiment of the present disclosure, the SIRT7 inhibitor means a substance that inhibits the expression or activity of SIRT7, and preferably acts specifically on an SIRT7 protein or gene. The SIRT7 expression inhibitor may reduce the level of SIRT7 in cells by reducing the expression level of SIRT7 or promoting the degradation of SIRT7, and the SIRT7 activity inhibitor may specifically bind to SIRT7 to reduce its activity. In the present disclosure, the SIRT7 inhibitor may be at least one selected from the group consisting of siRNA, an aptamer, an antisense oligonucleotide, and a compound, which are specific to the SIRT7 gene or protein.

In the present disclosure, "siRNA" refers to a small RNA fragment having a size of 21 to 25 nucleotides produced by cleavage of double-stranded RNA by a dicer, which specifically binds to mRNA having a complementary sequence to inhibit the expression. The siRNA may be chemically or enzymatically synthesized. The preparation method of siRNA is not particularly limited, and methods known in the art may be used. For example, the preparation method includes a method of directly chemically synthesizing siRNA, a synthesis method of siRNA using in vitro transcription, a method of cleaving long double-stranded RNA synthesized by in vitro transcription using an enzyme, an expression method through intracellular delivery of an shRNA expression plasmid or viral vector, an expression method through intracellular delivery of a polymerase chain reaction (PCR)-induced siRNA expression cassette, etc., but is not limited thereto.

Meanwhile, the pharmaceutical composition of the present disclosure may be used for nasal administration, and may be provided in an aerosol or spray formulation.

In addition, in the present disclosure, the allergic diseases may be particularly rhinitis, and the subject may be mammals in need of prevention or treatment of allergic diseases, preferably humans. The subject in need of prevention or treatment of allergic diseases may be a subject having an occurrence history of symptoms of allergic diseases or having a genetic factor.

Further, the present disclosure provides a screening method of a drug for preventing or treating allergic diseases including (1) administering a candidate substance to nasal cavity epithelial cells; (2) confirming an SIRT7 expression level of the cells; and (3) determining a candidate substance that reduces the expression level of SIRT7 compared to a control group without treating the candidate substance as a drug for preventing or treating the allergic diseases.

As an example embodiment of the present disclosure, the nasal cavity epithelial cells in step (1) may be genetically engineered to induce overexpression of SIRT7.

Advantageous Effects

According to the present disclosure, it is possible to block high-level processes of allergic reactions and fundamentally treat and prevent allergic diseases by suppressing SIRT7 of nasal cavity epithelial cells to inhibit the secretion of cytokines (thymic stromal lymphopoietin (TSLP)), which induces the activation of antigen presenting cells and the maturation of T cells to cause an inflammatory response.

BEST MODE FOR CARRYING OUT THE INVENTION

Figure 1:
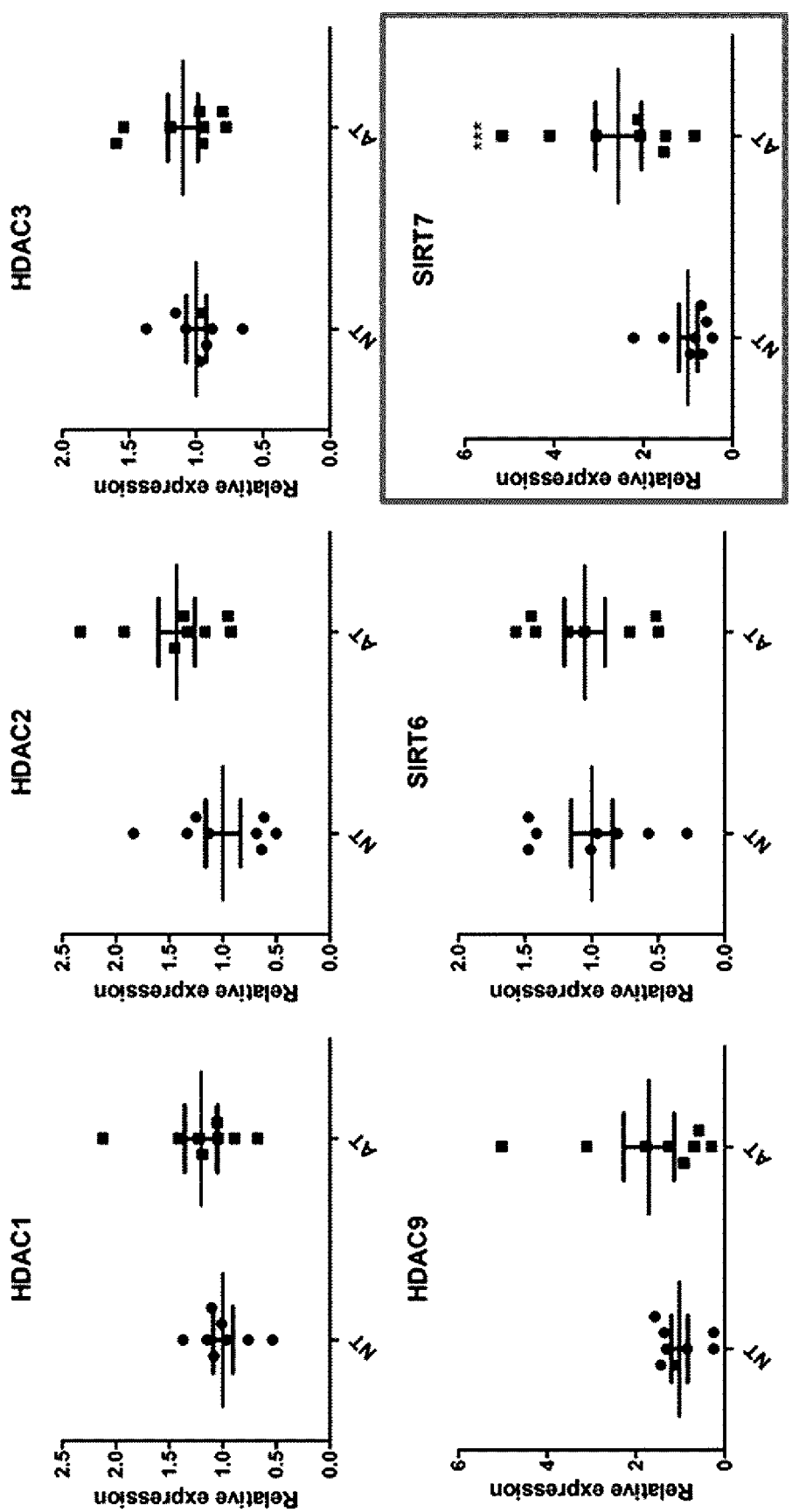
FIG. 1 is a diagram of confirming SIRT7 overexpression in allergic patients as a result of comparing gene expression levels in the inferior turbinates of normal and allergic patients according to an example embodiment.

The present inventors confirmed the reduction of an allergy mediator (TSLP: Thymic stromal lymphopoietin) secreted from nasal cavity epithelial cells by inhibiting an SIRT7 expression gene in human intranasal cavity epithelial cells and the reduction of secretion of the allergy mediator when inhibiting SIRT7 by siRNA to find a correlation between SIRT7 and allergic diseases and then completed the present disclosure.

Accordingly, the present disclosure provides a pharmaceutical composition for preventing and treating allergic diseases, including an agent for inhibiting the expression or activity of SIRT7.

Meanwhile, the present inventors confirmed the expression level of SIRT7 through tissue staining of the inferior turbinate of allergic patients, and as a result, confirmed that the expression of SIRT7 increased throughout the inferior turbinate tissue, but the expression of SIRT7 significantly increased in epithelial cells. Therefore, the pharmaceutical composition of the present disclosure may be provided for nasal administration, and may further include appropriate carriers, excipients, and diluents commonly used in the preparation of pharmaceutical compositions.

In the present disclosure, the prevention means all actions that delay the allergic diseases and symptoms thereof by administration of the composition according to the present disclosure, and the treatment means all actions that ameliorate or beneficially change the symptoms of the allergic diseases by administration of the pharmaceutical composition according to the present disclosure. In addition, a subject to be administered with the pharmaceutical composition of the present disclosure is not limited as long as the subject is a mammal, but may be preferably a human, and more specifically an allergic rhinitis patient.

In the present disclosure, the "carrier" is also called a vehicle, and refers to a compound that facilitates the addition of proteins or peptides into cells or tissues, and for example, dimethylsulfoxide (DMSO) is a commonly used carrier that facilitates the injection of many organic substances into the cells or tissues of living organisms.

In the present disclosure, the "diluent" is defined as a compound diluted in water that not only stabilizes a biologically active form of a target protein or peptide, but also dissolves the protein or peptide. Salts dissolved in a buffer solution are used as diluents in the art. A commonly used buffer solution is phosphate buffered saline, because the buffer solution imitates a salt state of a human solution. Since the buffer salt may control the pH of the solution at a low concentration, the buffer diluent rarely modifies the biological activity of the compound. Compounds containing azelaic acid used herein may be administered to human patients by themselves or as a pharmaceutical composition mixed with other ingredients or with suitable carriers or excipients, like combination therapy.

The pharmaceutical composition for preventing or treating the allergic diseases of the present disclosure may be formulated and used in the form of external preparations, such as powders, granules, tablets, capsules, suspensions, emulsions, syrups, aerosols, etc., and sterile injectable solutions, according to general methods. The carrier, the excipient, and the diluent which may be included in the composition may include lactose, dextrose, sucrose, oligosaccharide, sorbitol, mannitol, xylitol, erythritol, maltitol, starch, acacia rubber, alginate, gelatin, calcium phosphate, calcium silicate, cellulose, methyl cellulose, microcrystalline cellulose, polyvinylpyrrolidone, water, methyl hydroxybenzoate, propyl hydroxybenzoate, talc, magnesium stearate, and mineral oil. In the case of the formulation, the formulation may be prepared by using a diluent or an excipient, such as a filler, an extender, a binder, a wetting agent, a disintegrating agent, and a surfactant, which are commonly used. Solid formulations for oral administration include tablets, pills, powders, granules, capsules, and the like, and these solid formulations may be prepared by mixing at least one or more excipients, for example, starch, calcium carbonate, sucrose or lactose, gelatin, and the like. Further, lubricants such as magnesium stearate talc may be used in addition to simple excipients. Liquid formulations for oral administration may correspond to suspensions, oral liquids, emulsions, syrups, and the like, and may include various excipients, for example, a wetting agent, a sweetener, an aromatic agent, a preserving agent, and the like, in addition to water and liquid paraffin which are commonly used as simple diluents. Formulations for parenteral administration include a sterile aqueous solution, a non-aqueous solution, a suspension, an emulsion, a lyophilizing agent, and a suppository. As the non-aqueous solution and the suspension, propylene glycol, polyethylene glycol, vegetable oil such as olive oil, injectable ester such as ethyl oleate, and the like may be used. As a base compound of the suppository, witepsol, macrogol, tween 61, cacao butter, laurin paper, glycerogelatin, and the like may be used.

The pharmaceutical composition of the present disclosure may be administered orally or parenterally, preferably parenterally, and in the case of parenteral administration, the pharmaceutical composition may be administered through intramuscular injection, intravenous injection, subcutaneous injection, intraperitoneal injection, topical administration, transdermal administration, etc.

A suitable dose of the pharmaceutical composition of the present disclosure may be variously prescribed by factors, such as a formulation method, an administration type, age, weight, and sex of a patient, a pathological condition, food, an administration time, an administration route, an excretion rate, and response susceptibility.

The pharmaceutical composition of the present disclosure may be formulated by using a pharmacologically acceptable carrier and/or excipient according to a method that may be easily performed by those skilled in the art to be prepared in a unit dosage form or prepared by introduction into a multi-dosage container. In this case, the formulation may also be the form of solutions, suspensions, or emulsions in oily or aqueous media or the form of extracts, powders, granules, tablets or capsules, and may additionally include a dispersant or a stabilizer.

The present disclosure may have various modifications and various example embodiments and specific example embodiments will be illustrated in the drawings and described in detail in the detailed description. However, this does not limit the present disclosure within specific example embodiments, and it should be understood that the present disclosure covers all the modifications, equivalents and replacements within the idea and technical scope of the present disclosure. In the interest of clarity, not all details of the relevant art are described in detail in the present specification in so much as such details are not necessary to obtain a complete understanding of the present disclosure.

Example Embodiments

Example Embodiment 1. Confirmation of Gene Expression in Allergic Rhinitis Patients Inferior turbinate tissues of 10 patients without allergic rhinitis (NT) and 10 patients with allergic rhinitis (AT) were collected, and RNA was extracted and converted to cDNA. Real time PCR was performed to compare the gene expression levels of histone deacetylase 1 (HDAC1), histone deacetylase 2 (HDAC2), histone deacetylase 3 (HDAC3), histone deacetylase 9 (HDAC9), sitruin 6 (SIRT6), and SIRT7 for each cDNA. As a result, a significant difference in SIRT7 expression level between the two groups was confirmed (FIG. 1).

Figure 2:
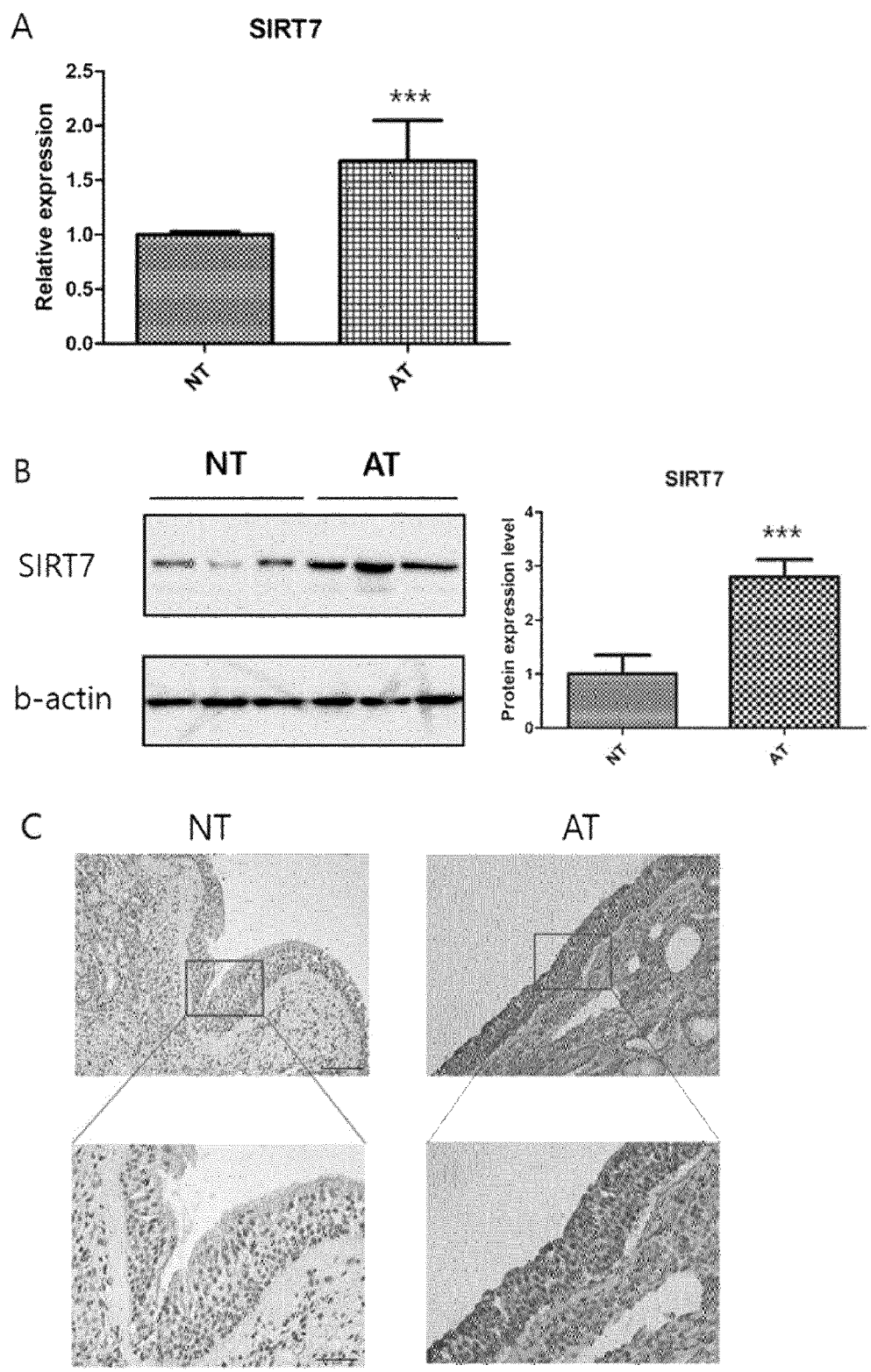
FIG. 2 is a graph of comparing protein expression levels of SIRT7 in the inferior turbinates of normal and allergic patients and micrographs of tissues according to an example embodiment.

Example Embodiment 2. Confirmation of Relation Between SIRT7 Expression and Allergic Rhinitis After a location of the inferior turbinate was confirmed with an endoscope, the surface of the inferior turbinate was scraped with a medical brush to collect epithelial cells and the collected epithelial cells were cultured in a culture dish for one week while replacing the culture medium once every two days. Then, after confirming that epithelial cells were sufficiently grown in the dish, RNA samples and protein samples were collected by adding an RNA extract reagent or a 5× sample buffer, and confirmed by real time PCR and western blotting, respectively. As a result, it was confirmed that SIRT7 was overexpressed in epithelial cells isolated from allergic rhinitis patients (FIGS. 2A and 2B).

The collected inferior turbinate tissue was dehydrated, made into a paraffin block, cut to a thickness of 0.4 μm, and fixed on a slide. Then, the deparaffinized tissue was stained using an SIRT7 antibody, stained with Hematoxylin, dehydrated, covered with cover glass, and observed under a microscope. As a result, it was confirmed that although SIRT7 was increased overall in the inferior turbinate of allergic rhinitis patients, the expression of SIRT7 was increased particularly in the epithelial cell portion (FIG. 2C).

Example Embodiment 3. Confirmation of Reduction of SIRT7 Expression and TSLP Secretion Using siRNA The isolated and cultured epithelial cells were treated with SIRT7 siRNA commercially sold and SIRT7 sequence (si1 or si2) produced by the present research team, and protein samples were collected with a 5× sample buffer and subjected to western blotting, and as a result, it was confirmed that the SIRT7 expression was significantly inhibited in the cells treated with an si2 sequence.

The specific information of siRNA used in the experiment was summarized in Table 1 below.

TABLE 1

| Commercial siRNA | Company name Product name- Cat. No | Santacruz SIRT7 siRNA(h)- sc63030 | |
|---|---|---|---|
| si1 sequence | guide RNA | 5' ACUUUCU UCCUUUUUGU GCGU 3' | SEQ ID NO: 1 |
| | Passenger RNA | 5' GCACAAA AAGGAAGAAA GUGA 3' | SEQ ID NO: 2 |
| si2 sequence | guide RNA | 5' UGAUUAC GUCACUUUCU UCCU 3' | SEQ ID NO: 3 |
| | Passenger RNA | 5' GAAGAAA GUGACGUAAU CACG 3' | SEQ ID NO: 4 |

Figure 3:
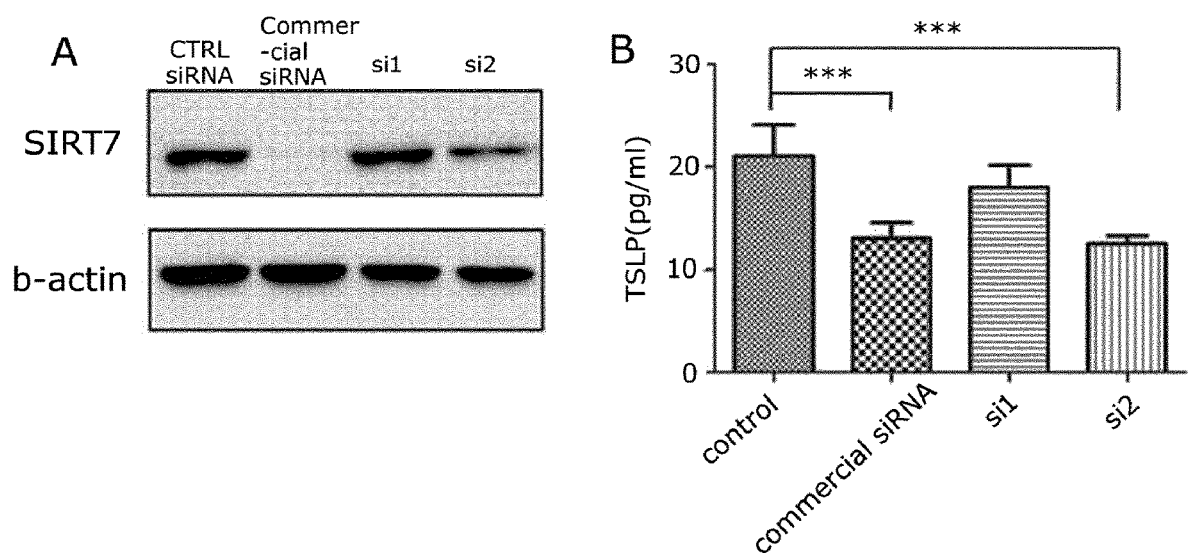
FIG. 3 is a diagram of confirming that an allergy mediator (TSLP) is reduced as a result of inhibiting SIRT7 using siRNA according to an example embodiment.

Then, as a result of conducting a separate TSLP ELISA using the epithelial cell culture medium collected in Example embodiment 2, it was confirmed that TSLP secretion was significantly reduced in the commercial siRNA and si2 treated groups (FIG. 3).

As described above, specific parts of the present disclosure have been described in detail, and it will be apparent to those skilled in the art that these specific techniques are merely preferred example embodiments, and the scope of the present disclosure is not limited thereto. Therefore, the substantial scope of the present disclosure will be defined by the appended claims and their equivalents.

The present disclosure may be applied to medicine, non-medicinal use, health functional foods, and the like for treatment of allergic diseases, particularly rhinitis.

---

The invention claimed is:

1. A pharmaceutical composition for preventing or treating allergic rhinitis comprising an siRNA including a nucleotide sequence of SEQ ID NO: 1 or the nucleotide sequence of SEQ ID NO:3 and a pharmaceutically acceptable carrier.

2. The pharmaceutical composition of claim 1, wherein the siRNA is an oligonucleotide of 20 to 40 nucleotides.

3. The pharmaceutical composition of claim 1, wherein the composition is for nasal administration.

4. A screening method of a drug for preventing or treating allergic rhinitis comprising:
   (1) administering an siRNA including a nucleotide sequence of SEQ ID NO:1 or a nucleotide sequence of SEQ ID NO:3 as a candidate substance to nasal cavity epithelial cells;
   (2) confirming a Sirtuin 7 (SIRT7) expression level of the cells; and
   (3) determining that the siRNA reduces the expression level of Sirtuin 7 (SIRT7) compared to a control group without treating with the siRNA, and selecting the siRNA as a drug candidate for preventing or treating allergic rhinitis.

5. The screening method of claim 4, wherein the nasal cavity epithelial cells in step (1) are genetically engineered to overexpress Sirtuin 7 (SIRT7).

6. A method for preventing or treating allergic rhinitis comprising nasally administering, to a subject in need thereof, a pharmaceutical composition comprising an siRNA including a nucleotide sequence of SEQ ID NO:1 or the nucleotide sequence of SEQ ID NO:3 and a pharmaceutically acceptable carrier.

* * * * *